(12) United States Patent
Romas, Jr. et al.

(10) Patent No.: US 9,660,443 B1
(45) Date of Patent: May 23, 2017

(54) CONTROL CIRCUITS WITH ENERGY RECYCLING FOR ENVELOPE ELIMINATION AND RESTORATION AND RELATED METHODS

(71) Applicant: Lockheed Martin Corporation, Bethesda, MD (US)

(72) Inventors: Gregory G. Romas, Jr., Coppell, TX (US); Thomas E. Byrd, Grand Prairie, TX (US); Huan V. Le, Sachse, TX (US); Tyrel D. Parks, Arlington, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 14/932,205

(22) Filed: Nov. 4, 2015

(51) Int. Cl.
*H02J 1/00* (2006.01)

(52) U.S. Cl.
CPC ..................... *H02J 1/00* (2013.01)

(58) Field of Classification Search
CPC .......................... H02J 1/00; H02M 2001/0048
See application file for complete search history.

(56) References Cited

U.S. PATENT DOCUMENTS

| | | | | |
|---|---|---|---|---|
| 5,847,941 A * | 12/1998 | Taguchi | ................. | H02M 1/34 363/21.03 |
| 7,834,596 B2 * | 11/2010 | Hsieh | ................... | H03M 1/002 320/166 |
| 7,888,920 B2 * | 2/2011 | Chen | ................... | G09G 3/3406 323/271 |
| 8,497,605 B2 * | 7/2013 | Kundur Subramaniyan | ...... | G06F 1/3203 307/151 |
| 8,947,057 B2 * | 2/2015 | Martin | ................. | H02M 3/156 323/222 |
| 2006/0145954 A1 * | 7/2006 | Kubota | ................ | G09G 3/2965 345/66 |

* cited by examiner

*Primary Examiner* — Jeffrey Zweizig
(74) *Attorney, Agent, or Firm* — Withrow & Terranova, PLLC

(57) ABSTRACT

Control circuits with energy recycling for envelope elimination and restoration and related methods are disclosed. A control circuit includes a filter module configured to condition an input power signal to provide an output power signal. An energy recapture module is electrically coupled to the filter module and is configured to capture a portion of residual energy from the filter module and return the portion of the residual energy to the input power signal. A control module is electrically coupled to the filter module and the energy recapture module and is configured to control the filter module to provide the output power signal and is further configured to control the energy recapture module to capture and return the portion of the residual energy to the input power signal.

18 Claims, 11 Drawing Sheets

CONTROL CIRCUITS WITH ENERGY RECYCLING FOR ENVELOPE ELIMINATION AND RESTORATION AND RELATED METHODS

TECHNICAL FIELD

The embodiments relate generally to control circuits, and particularly to control circuits with energy recycling for envelope elimination and restoration.

BACKGROUND

Technological advances in communication infrastructures and protocols have turned computing devices into valuable communication tools. Computing devices can communicate with each other over networks ranging from Local Area Networks (LANs) to wide reaching Global Area Networks (GANs) such as the Internet. For example, computing devices are now capable of communicating voice, text or other data, documents, images, video and other multimedia content (generally referred to herein as communications). As usage of these computing devices increases, so does the need for these computing devices to process and exchange data at increased speeds and/or power levels, which may require electrical components therein to operate at high switching frequencies, and which may in turn result in a need to quickly charge and discharge circuit capacitances, both intended and parasitic.

For example, in radio frequency (RF) transmission applications, circuits within a computing device may need to operate using a high peak-to-peak average power transmission and, therefore, may need to switch on and off corresponding loads, such as amplifiers, at high frequency rates. This switching of loads on and off requires fast charging and discharging of energy in corresponding capacitors. Discharged residual energy from these capacitors, and also from other parasitic elements in the computing device, is generally lost and/or dissipated as heat, therefore decreasing energy efficiency and/or increasing cooling requirements in the computing device.

SUMMARY

The embodiments relate to control circuits with energy recycling for envelope elimination and restoration and related methods. In a non-limiting embodiment, a control circuit generating an output power signal at a high frequency includes an energy recapture module that captures a portion of residual energy, which would otherwise be lost, and provides the captured portion of residual energy to an input power signal of the control circuit. Among other advantages, this embodiment increases power efficiency of the control circuit, produces a better output power signal, and lessens energy and cooling requirements of the corresponding system.

In one embodiment, a control circuit for generating an output power signal is provided. The control circuit includes a filter module configured to condition an input power signal to provide an output power signal. The control circuit further includes an energy recapture module that is electrically coupled to the filter module and that is configured to capture a portion of residual energy from the filter module and return the portion of the residual energy to the input power signal. The control circuit further includes a control module that is electrically coupled to the filter module and the energy recapture module and that is configured to control the filter module to provide the output power signal and further configured to control the energy recapture module to capture and return the portion of the residual energy to the input power signal.

In another embodiment, a method for generating an output power signal is provided. The method includes receiving, by a filter module, an input power signal and conditioning, by the filter module, the input power signal to provide an output power signal. The method further includes capturing, by an energy recapture module electrically coupled to the filter module, a portion of residual energy from the filter module and returning, by the energy recapture module, the portion of the residual energy to the input power signal.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first period of time" and "second period of time," and does not imply a priority, a type, an importance, or other attribute, unless otherwise stated herein.

The embodiments implement a control circuit that receives an input power signal and provides an output power signal. The output power signal can be used to drive, for example, one or more amplifiers at a high frequency for wireless communications. The control circuit includes a filter module that conditions the input power signal to provide the output power signal at a steady and reliable level. The control circuit further includes an energy recapture module, electrically coupled to the filter module, which captures a portion of residual energy from the filter module when the output power signal is at a high voltage level, and returns the portion of the residual energy to the input power signal when the output power signal is at a low voltage level. The control circuit further includes a control module, coupled to the filter module and the energy recapture module, configured to control the filter module to provide the output power signal and configured to control the energy recapture module to capture and return the portion of the residual energy to the input power signal.

Figure 1:
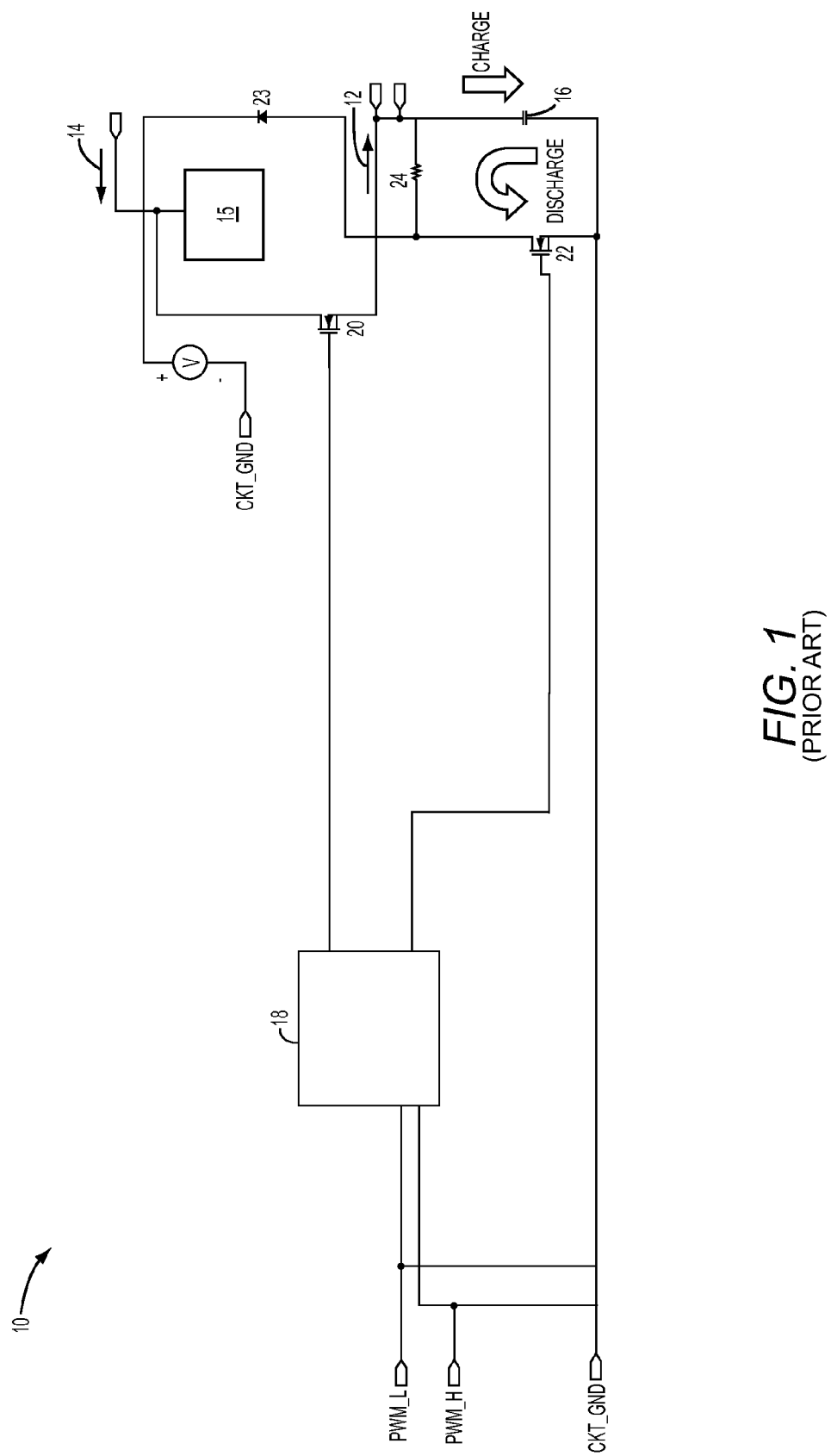
FIG. 1 is a circuit diagram of a conventional control circuit for generating an output power signal.

For help with understanding the embodiments herein, a conventional control circuit for generating an output power signal will be described below with reference to FIG. 1. FIG. 1 is a circuit diagram of a conventional control circuit 10 for generating an output power signal 12. An input power signal 14 provides a direct current (DC) voltage of, for example, 6 volts (V), to the control circuit 10. The input power signal 14 is buffered by input buffer 15 to provide a stable power source to drive the output power signal 12. The output power signal 12 is an alternating signal, such as a square wave, with a peak-to-peak range of, for example, 6 V, based on the input power signal 14. The output power signal 12 can be used to drive, for example, one or more amplifiers (not shown) at a high switching frequency.

During a period in which the output power signal 12 is provided at a high voltage level, a bias capacitor 16 is charged up to a high voltage level of, for example, the input power signal 14, to reach a charged state. In particular, at the beginning of the period of providing the output power signal 12 at the high voltage level, a control module 18 turns on a transistor 20, allowing current from the input power signal 14 to charge the bias capacitor 16. The control module 18 also turns off a transistor 22, which creates an open circuit and allows the bias capacitor 16 to receive and hold charge from the input power signal 14. Furthermore, other electrical components of the control circuit 10, such as the transistors 20, 22, a diode 23, and the printed circuit board on which electrical components of the control circuit 10 are laid, may possess parasitic capacitance. For example, the transistors 20, 22 and the diode 23 may possess junction capacitance in their p-n junctions, and the printed circuit board may possess board layer capacitance. Accordingly, in addition of the bias capacitor 16, other electrical components of the control circuit 10 may receive and hold charge from the input power signal 14 due to their corresponding parasitic capacitances. Moreover, such parasitic capacitances may even be large enough to obviate the need for a bias capacitor 16 in the control circuit 10. For clarity of discussion, however, charge received and held from the input power signal 14 will be discussed only with reference to the bias capacitor 16. In conjunction with other elements, once the bias capacitor 16 is charged up to the voltage level of the input power signal 14, the bias capacitor 16 provides the output power signal 12 at a stable high voltage level.

During a period in which the output power signal 12 is provided at a low voltage level, the bias capacitor 16 is discharged down to a low voltage level of, for example, a circuit ground, or 0 V. In particular, at the beginning of the period of providing the output power signal 12 at the low voltage level, the control module 18 turns off the transistor 20 to disconnect the bias capacitor 16 from the input power signal 14, and turns on the transistor 22 to provide a discharge path from the bias capacitor 16 to the circuit ground to discharge a residual energy stored in the bias capacitor 16. A resistor 24 is used to control the discharge rate of the residual energy from the bias capacitor 16 in the discharge path. Accordingly, the residual energy is lost and dissipated as heat in a circuit resistance element, for example, the resistor 24.

Figure 2:
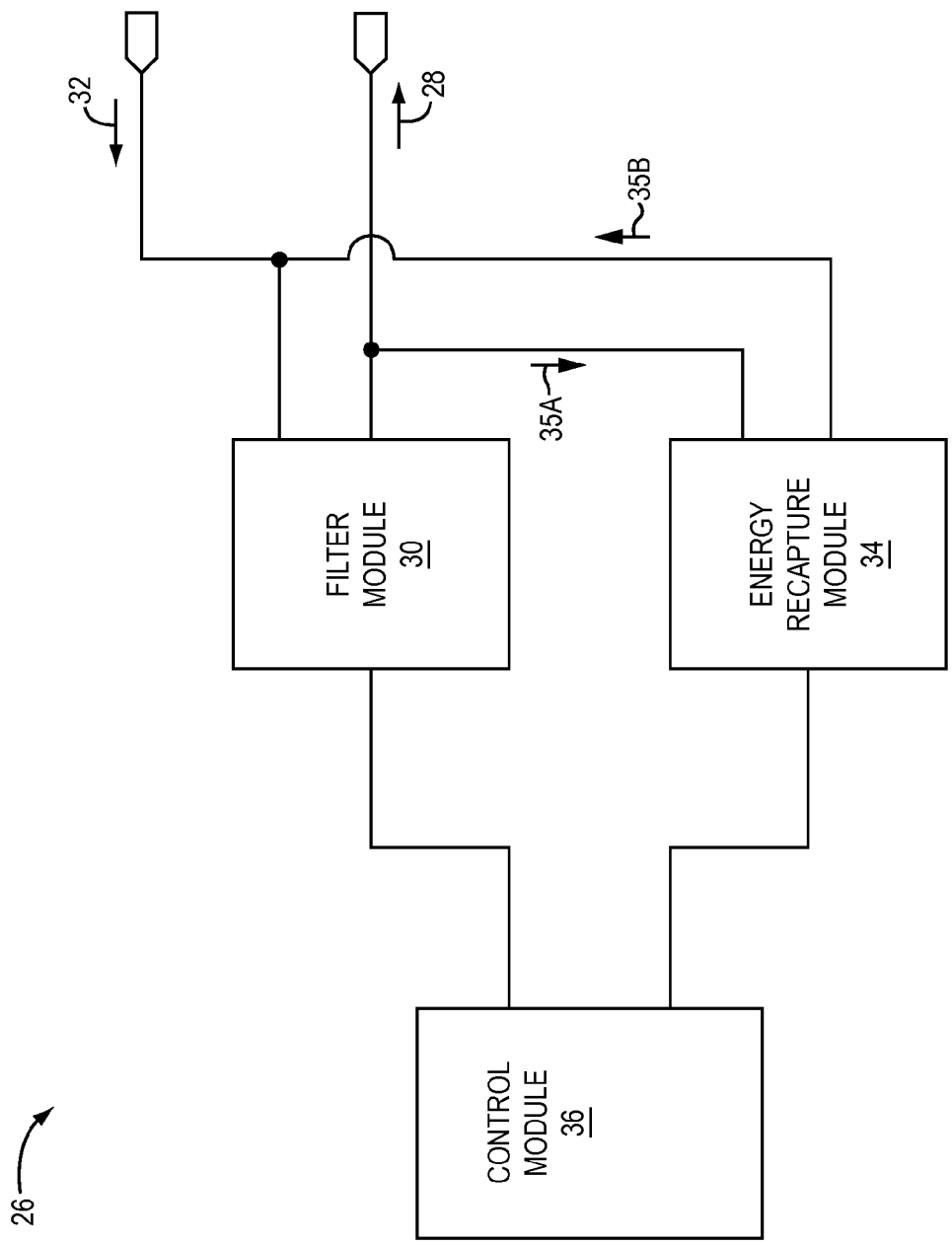
FIG. 2 is a block diagram of a control circuit for generating an output power signal according to one embodiment.

FIG. 2 is a block diagram of a control circuit 26 for generating an output power signal 28 according to one embodiment. The control circuit 26 includes a filter module 30 that conditions an input power signal 32 to provide the output power signal 28 at a steady and reliable level. The output power signal 28 is an alternating signal (not shown), such as a square wave, with a peak-to-peak range that is based on the input power signal 32. The control circuit 26 further includes an energy recapture module 34, electrically coupled to the filter module 30, that captures a portion of residual energy discharged by the filter module 30 along a signal path 35A when the output power signal 28 is at a high voltage level, and that returns the portion of the residual energy to a source of the input power signal 32 (not shown) along a signal path 35B when the output power signal 28 is at a low voltage level. The control circuit 26 further includes a control module 36 that is coupled to the filter module 30 and the energy recapture module 34. The control module 36 is configured to control the filter module 30 to provide the output power signal 28 and is configured to control the energy recapture module 34 to capture the portion of the residual energy discharged by the filter module 30 and return the portion of the residual energy to the source of the input power signal 32 (not shown).

Figure 3:
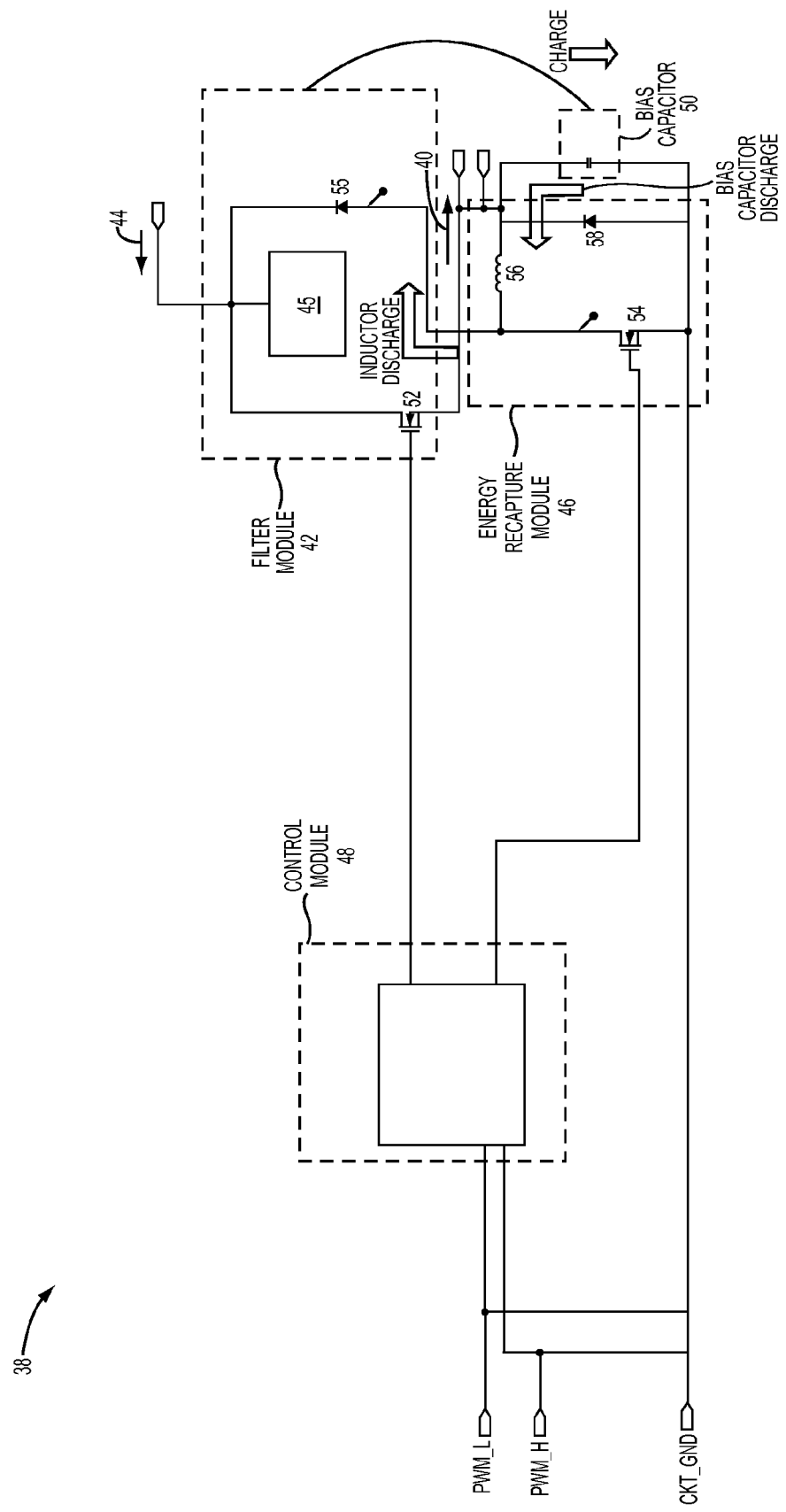
FIG. 3 is a circuit diagram of a control circuit for generating an output power signal according to one embodiment.

FIG. 3 is a circuit diagram of a control circuit 38 for generating an output power signal 40 according to one embodiment. The control circuit 38 includes a filter module 42 that conditions an input power signal 44 to provide the output power signal 40 at a steady and reliable level. The control circuit 38 further includes an energy recapture module 46, electrically coupled to the filter module 42, that captures a portion of residual energy from the filter module 42 when the output power signal 40 is at a high voltage level and that returns the portion of the residual energy to the input power signal 44 when the output power signal 40 is at a low voltage level. The control circuit 38 further includes a control module 48 that is coupled to the filter module 42 and the energy recapture module 46. The control module 48 is configured to control the filter module 42 to provide the output power signal 40 and is configured to control the energy recapture module 46 to capture and return the portion of the residual energy to the input power signal 44. The input power signal 44 provides a DC voltage of, for example, 6 V, to the control circuit 38. The input power signal 44 is buffered by an input buffer 45 to provide a stable power source to drive the output power signal 40. The output power signal 40 is an alternating signal, such as a square signal, with a peak-to-peak range of, for example, 6 V, based on the input power signal 44. The output power signal 40 can be used to drive, for example, one or more amplifiers (not shown) at a high switching frequency.

During a period of providing the output power signal 40 at a high voltage level, a bias capacitor 50 is charged up to a high voltage level of, for example, 6 V, which is the voltage level of the input power signal 44, to reach a charged state. In particular, at the beginning of the period of providing the output power signal 40 at the high voltage level, the control module 48 turns on a transistor 52, allowing current from the input power signal 44 to charge the bias capacitor 50. The control module 48 also turns off a transistor 54, which creates an open circuit and allows the bias capacitor 50 to receive and hold charge from the input power signal 44. Furthermore, other electrical components of the control circuit 38, such as the transistors 52, 54, a diode 55, and the printed circuit board on which electrical components of the control circuit 38 are laid, may possess parasitic capacitance. For example, the transistors 52, 54, and the diode 55 may possess junction capacitance in their p-n junctions, and the printed circuit board may possess board layer capacitance. Accordingly, in addition of the bias capacitor 50, other electrical components may receive and hold charge from the input power signal 44 due to their corresponding parasitic capacitances. Moreover, such parasitic capacitances may even be large enough to obviate the need for a bias capacitor 50 in the control circuit 38. For clarity of discussion, however, charge received and held from the input power signal 44 will be discussed only with reference to the bias capacitor 50. In conjunction with other elements, once the bias capacitor 50 is charged up to the voltage level of the input power signal 44, the bias capacitor 50 provides the output power signal 40 at a stable high voltage level.

During a period of providing the output power signal 40 at a low voltage level, the bias capacitor 50 is discharged down to a low voltage level of, for example, the circuit ground, or 0 V. In particular, at the beginning of the period of providing the output power signal 40 at the low voltage level, the control module 48 turns off the transistor 52 to disconnect the bias capacitor 50 from the input power signal 44, and the control module 48 turns on the transistor 54 to provide a discharge path from the bias capacitor 50 to the circuit ground to discharge a residual energy stored in the bias capacitor 50. However, instead of discharging the residual energy to the circuit ground through a resistor, the energy recapture module 46 includes and uses an inductor 56, located in series with the bias capacitor 50, and a diode 58, located in parallel to the bias capacitor 50. This configuration transfers the residual energy from the bias capacitor 50 into the inductor 56. Thus, in this embodiment, a portion of the residual energy is not lost and dissipated as heat in a circuit resistive element. Instead, the portion of the residual energy is stored such that it may be used afterwards.

Figure 4A:
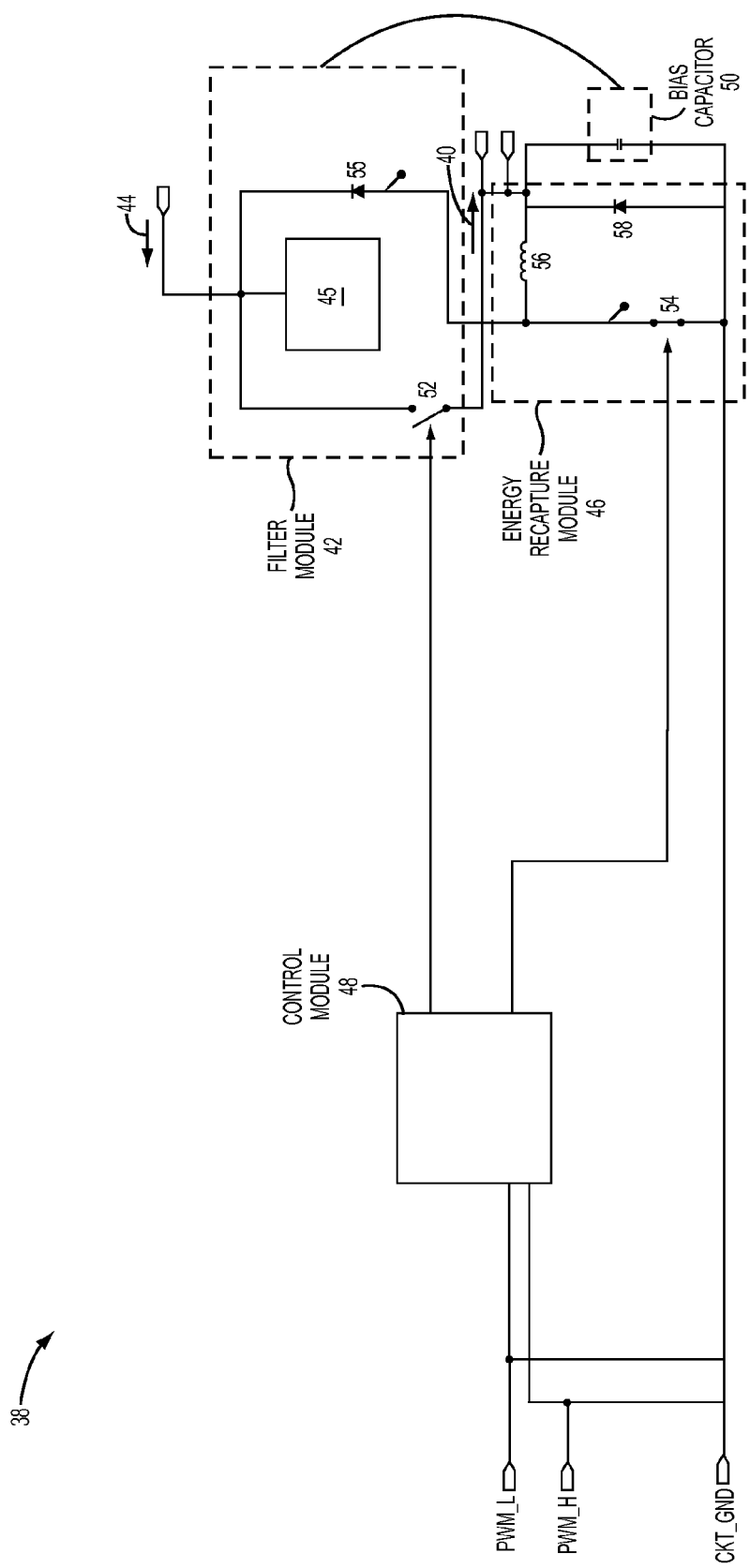
FIGS. 4A-4C are circuit diagrams of the control circuit illustrated in FIG. 3 for generating an output power signal according to one embodiment during a first, a second, and a third period of time, respectively.
Figure 4B:
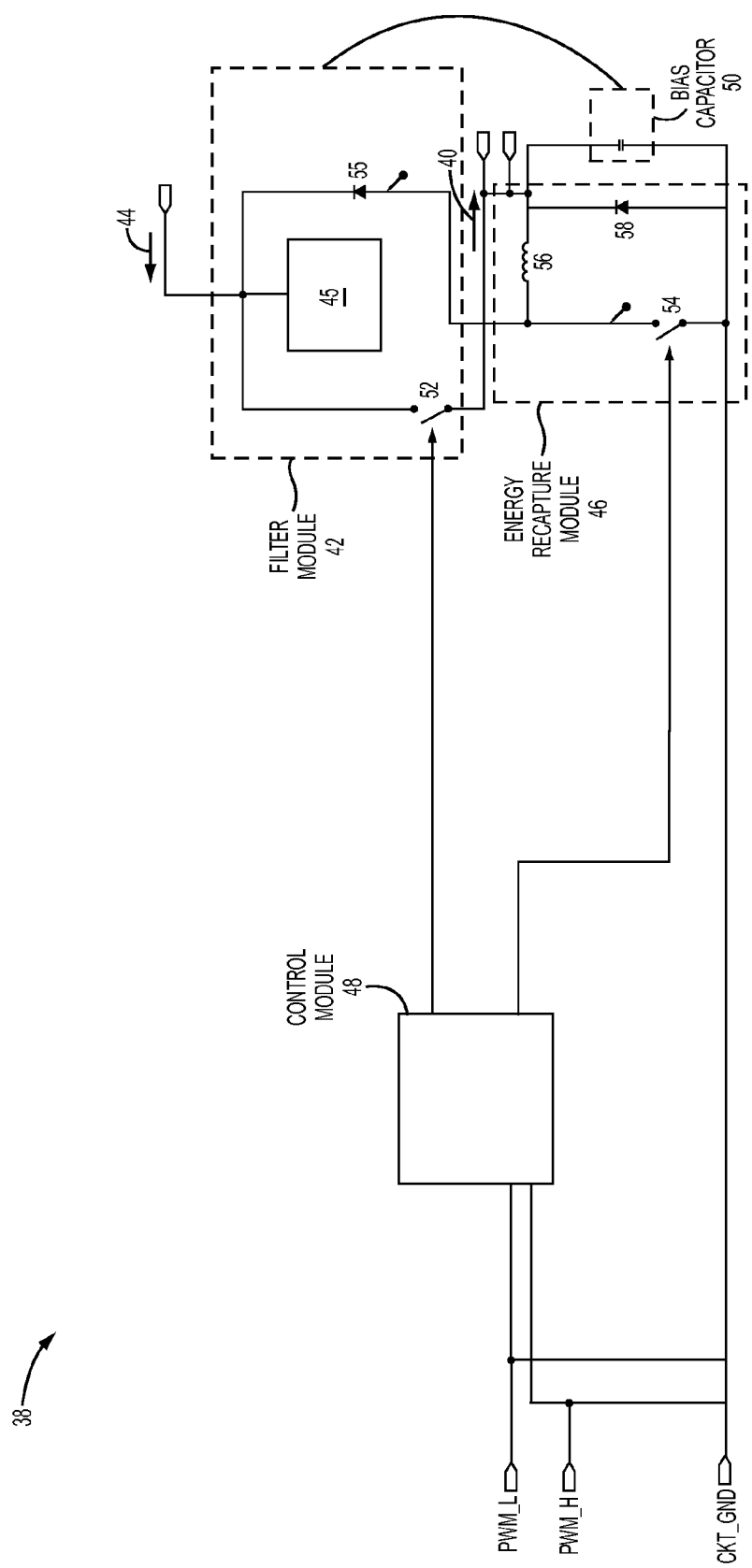
Figure 4C:
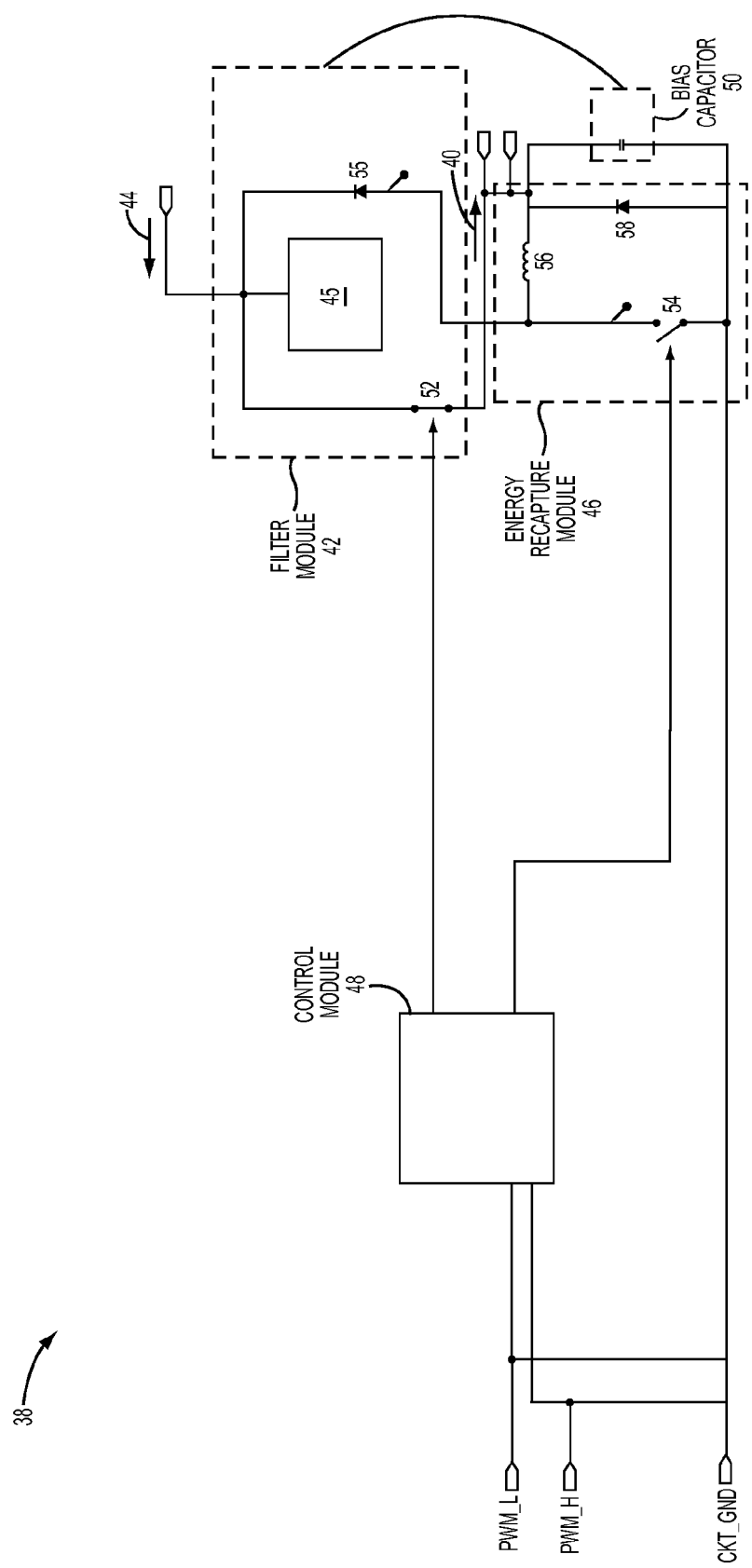

FIGS. 4A-4C are circuit diagrams of the control circuit 38 illustrated in FIG. 3 for generating an output power signal 40 according to one embodiment during a first, a second, and a third period of time, respectively. The control circuit 38 is the same as the one described with respect to FIG. 3. Accordingly, descriptions of previously-described elements will be omitted unless necessary for understanding a particular feature.

When the output power signal 40 is at a high voltage level, the bias capacitor 50 is charged up to the high voltage level to reach a charged state. To transition the output power signal 40 to a low voltage level, the control module 48 configures the control circuit 38 as illustrated in FIG. 4A. Specifically, the control module 48 turns off transistor 52, depicted in FIG. 4A as an open switch, to disconnect the bias capacitor 50 from the input power signal 44 during a first period of time. The control module 48 also turns on the transistor 54, depicted in FIG. 4A as a closed switch, during the first period of time to provide a discharge path from the bias capacitor 50 to the circuit ground in order to discharge a residual energy stored in the bias capacitor 50. However, instead of discharging the residual energy to the circuit ground through a resistor, the energy recapture module 46 uses the inductor 56 to transfer the residual energy from the bias capacitor 50 into the inductor 56. Thus, in this embodiment, a portion of the residual energy is not lost and dissipated as heat in a circuit resistive element. Instead, the portion of the residual energy is stored during the first period of time such that it may be used afterwards.

It is noted that the transferring of the residual energy from the bias capacitor 50 corresponds to the transition of the output power signal 40 from the high voltage level to the low voltage level, as the voltage across the bias capacitor 50 corresponds to the voltage of the output power signal 40. It is further noted that the first period of time corresponds to a resonant time of the bias capacitor 50 into the inductor 56, which follows the following formulas:

$$t = \pi * \sqrt{L*C}$$

$$i = C * \frac{V0 - V1}{t}$$

where t denotes time, C denotes a capacitance of the bias capacitor 50, V0 denotes a charge voltage in the bias capacitor 50, V1 denotes a discharge voltage in the bias capacitor 50, L is the inductance 56, and i corresponds to a discharge current. The discharge current depends on characteristics of the inductor 56 and the transistor 54 related to transferring the residual energy from the bias capacitor 50. For example, if C=10 nF, L=10 nH, V0=6V, V1=0V, then t would equal 31.4 nsec.

Once the residual energy is transferred from the bias capacitor 50 into the inductor 56 and once the output power signal 40 is at the low voltage level, the control module 48 configures the control circuit 38 as illustrated in FIG. 4B. Specifically, the control module 48 turns off the transistor 54, depicted in FIG. 4B as an open circuit, to disconnect the inductor 56 from the path to the circuit ground during a second period of time. This configuration forces the inductor 56 to discharge the portion of the residual energy captured from the bias capacitor 50 into the input power signal 44 through the path containing diodes 55 and 58 and the input buffer 45, thus returning the portion of the residual energy to the input power signal 44.

When it becomes necessary to transition the output power signal 40 from the low voltage level to the high voltage level, the control module 48 configures the control circuit 38 as illustrated in FIG. 4C. Specifically, the control module 48 turns on the transistor 52, depicted in FIG. 4C as a closed circuit, allowing current from the input power signal 44 to flow towards the output power signal 40 and the bias capacitor 50 during a third period of time. The control module 48 also turns off or keeps off the transistor 54, depicted in FIG. 4C as an open circuit, during the third period of time. This allows the bias capacitor 50 to receive and hold charge from the input power signal 44. In conjunction with other elements, once the bias capacitor 50 is charged up to the voltage level of the input power signal 44, the bias capacitor 50 provides the output power signal 40 at a stable high voltage level.

Figure 5:
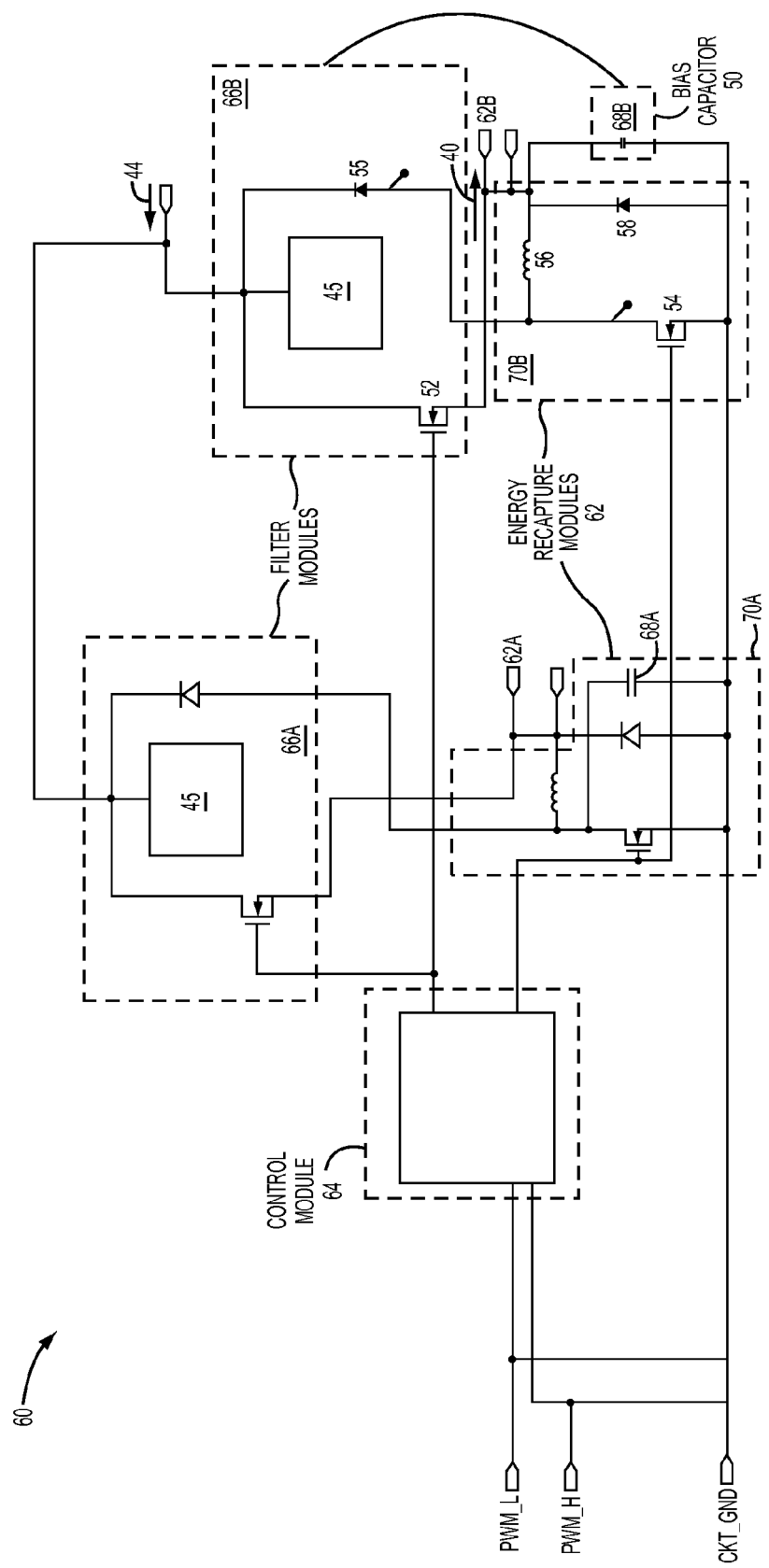
FIG. 5 is a circuit diagram of a control circuit for generating an output power signal according to one embodiment.

Although the embodiments illustrated in FIGS. 3 and 4A-4C provide only one filter module 42 and one energy recapture module 46, embodiments may include a plurality of filter modules and a plurality of energy recapture modules. In this regard, FIG. 5 is a circuit diagram of a control circuit 60 for generating output power signals 62*a* and 62*b* (generally "output power signals 62") according to one embodiment. In particular, the control circuit 60 includes a control module 64 and filter modules 66*a* and 66*b* (generally "filter modules 66"), and each filter module 66 includes respective bias capacitors 68*a* and 68*b* (generally "bias capacitors 68") and energy recapture modules 70*a* and 70*b* (generally "energy recapture modules 70"). In operation, each of the elements depicted in FIG. 5 operates similar to their counterpart elements in FIGS. 3 and 4A-4C, and therefore, further description is omitted herein.

Figure 6:
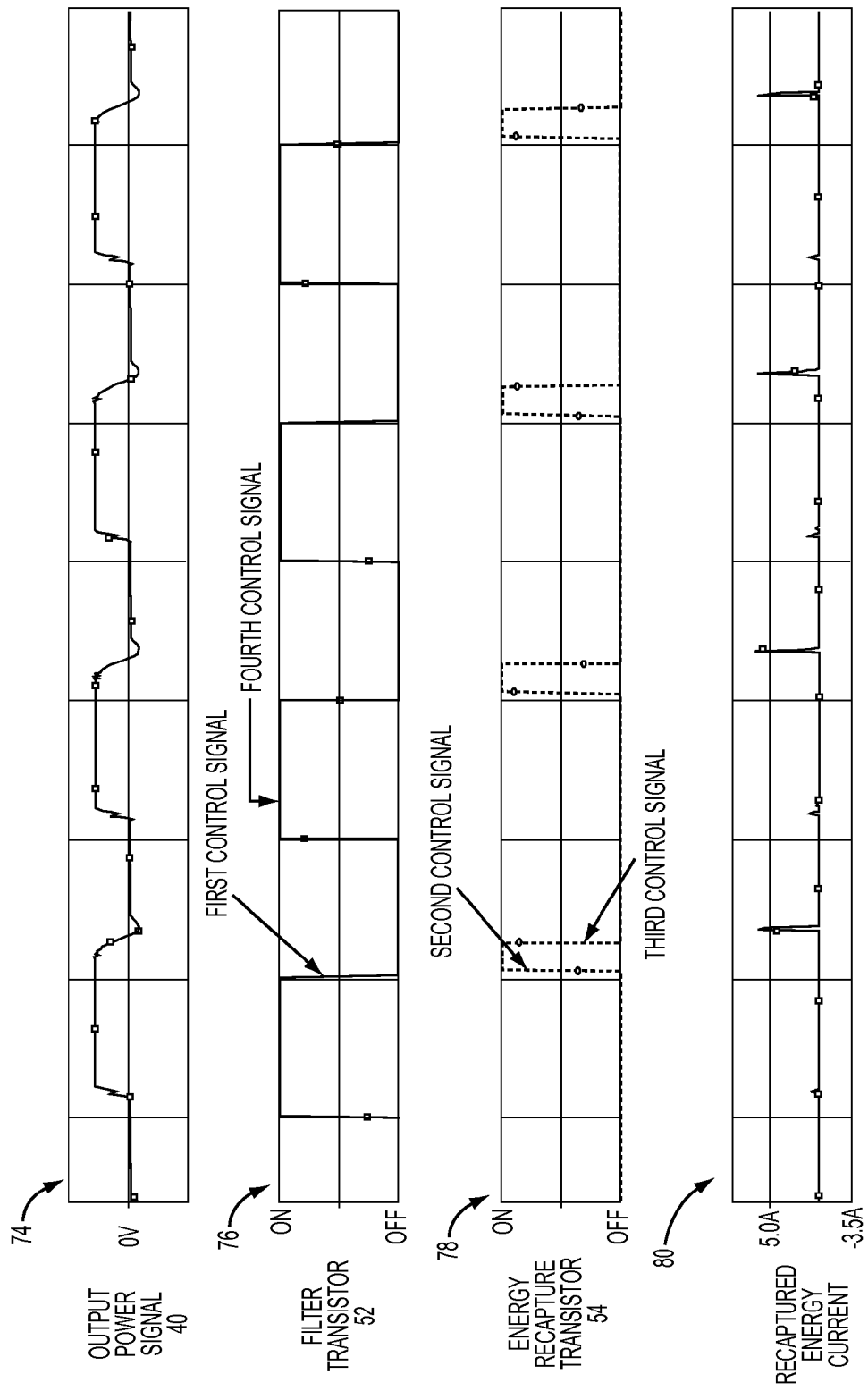
FIG. 6 is a timing diagram illustrating aspects of one embodiment.

FIG. 6 is a timing diagram 72 illustrating aspects of one embodiment. The timing diagram 72 will be described with reference to FIGS. 3 and 4A-4C. The timing diagram 72 includes a plot 74 of the output power signal 40 according to the embodiment depicted in FIGS. 3 and 4A-4C. The timing diagram 72 further includes a plot 76 corresponding to a control of the transistor 52 of the filter module 42 and a plot 78 corresponding to a control of the transistor 54 of the energy recapture module 46, according to the embodiment depicted in FIGS. 3 and 4A-4C. The timing diagram 72 further includes a plot 80 corresponding to a current from the energy recapture module 46 to the input power signal 44 according to the embodiment depicted in FIGS. 3 and 4A-4C.

To transition the output power signal 40 from a high voltage level (Vh) to a low voltage level (Vl), the control module 48 configures the control circuit 38 as illustrated in FIG. 4A. Specifically, the control module 48 turns off transistor 52, depicted in plot 76 as a transition from an ON state to an OFF state, to disconnect the bias capacitor 50 from the input power signal 44 during the first period of time. The control module 48 also turns on the transistor 54, depicted in plot 78 as a transition from the OFF state to the ON state, during the first period of time to provide a discharge path from the bias capacitor 50 to the circuit ground to discharge a residual energy stored in the bias capacitor 50. As noted above with reference to FIG. 4A, the energy recapture module 46 includes the inductor 56, and the residual energy from the bias capacitor 50 is transferred into the inductor 56. The plot 74 illustrates that during the first period of time the output power signal 40 transitions from Vh to Vl.

Once the residual energy is transferred from the bias capacitor 50 into the inductor 56 and the output power signal 40 is at Vl, the control module 48 configures the control circuit 38 as illustrated in FIG. 4B. Specifically, the control module 48 turns off the transistor 54, depicted in the plot 78 as a transition from the ON state to the OFF state, to disconnect the inductor 56 from the path to the circuit ground during the second period of time. This configuration forces the inductor 56 to discharge a portion of the residual energy captured from the bias capacitor 50 through the path containing diodes 55 and 58 and the input buffer 45 and into the input power signal 44, as depicted in plot 80, thus returning the portion of the residual energy to the input power signal 44. At this time, a control signal to the transistor 54 could either be left in the OFF state or transition to the ON state, again depending upon the desired output impedance of the supply.

When it becomes necessary to transition the output power signal 40 from Vl to Vh, the control module 48 configures the control circuit 38 as illustrated in FIG. 4C. Specifically, the control module 48 turns on the transistor 52, depicted in the plot 76 as a transition from the OFF state to the ON state, allowing current from the input power signal 44 to flow towards the output power signal 40 and the bias capacitor 50 during the third period of time. The control module 48 also turns/keeps off the transistor 54, depicted in the plot 78 as maintaining the off state, during the third period of time. This allows the bias capacitor 50 to receive and hold charge from the input power signal 44 and thus provide the output power signal 40 at a stable high voltage level, as depicted in the plot 74 as a transition from Vl to Vh.

Figure 7:
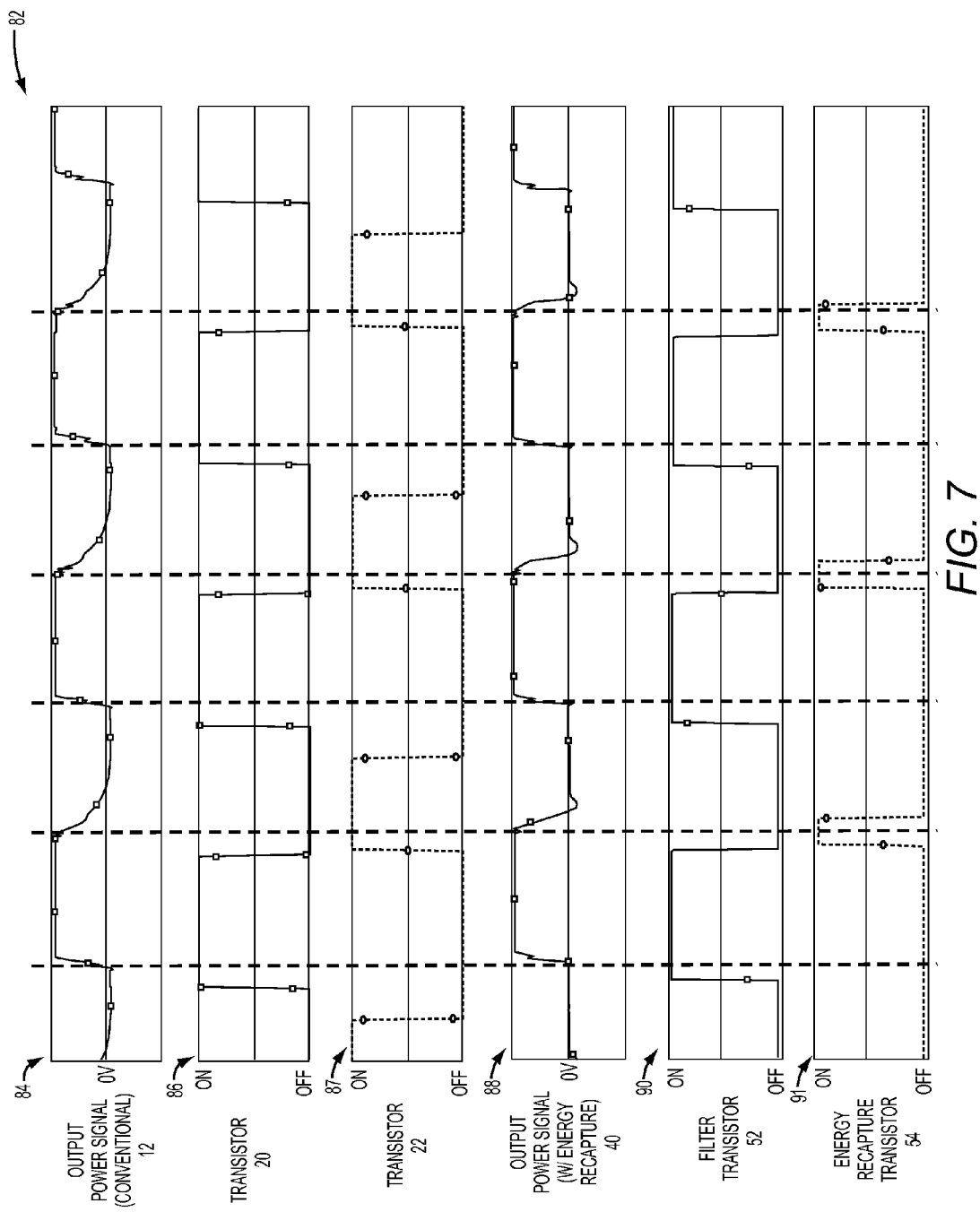
FIG. 7 is a timing diagram illustrating aspects of one embodiment relative to a conventional control circuit.

FIG. 7 is a timing diagram 82 illustrating aspects of one embodiment relative to a conventional control circuit. The timing diagram 82 will be described with reference to FIG. 1, depicting the conventional control circuit 10, and FIG. 3, depicting the control circuit 38 according to one embodiment. The timing diagram 82 includes a plot 84 of the output power signal 12 according to the conventional control circuit 10. The timing diagram 82 further includes plots 86 and 87, corresponding to control signals provided to the transistors 20 and 22 of the conventional control circuit 10, respectively.

The timing diagram 82 further includes a plot 88 of the output power signal 40 according to the control circuit 38 according to an embodiment. The timing diagram 82 further includes plots 90 and 91 corresponding to control signals provided to the transistors 52 and 54 of the control circuit 38, respectively. As can be seen in the timing diagram 82, the transition of the output power signal 12 from Vh to Vl occurs more slowly than the transition of the output power signal 40 from Vh to Vl. This occurs because the inductor 56 in the control circuit 38 accelerates the discharge current drain from the bias capacitor 50, thus creating a voltage drop across the bias capacitor 50 of the control circuit 38 that is faster than a voltage drop across the bias capacitor 16 of the conventional control circuit 10. A faster voltage drop across the bias capacitor 50 is desirable since, for example, it allows the control circuit 38 to drive a corresponding load, for example an amplifier, at a higher frequency. Therefore, in addition to increasing power efficiency through the capture and return of residual energy, the embodiment produces a better output power signal 40.

Figure 8:
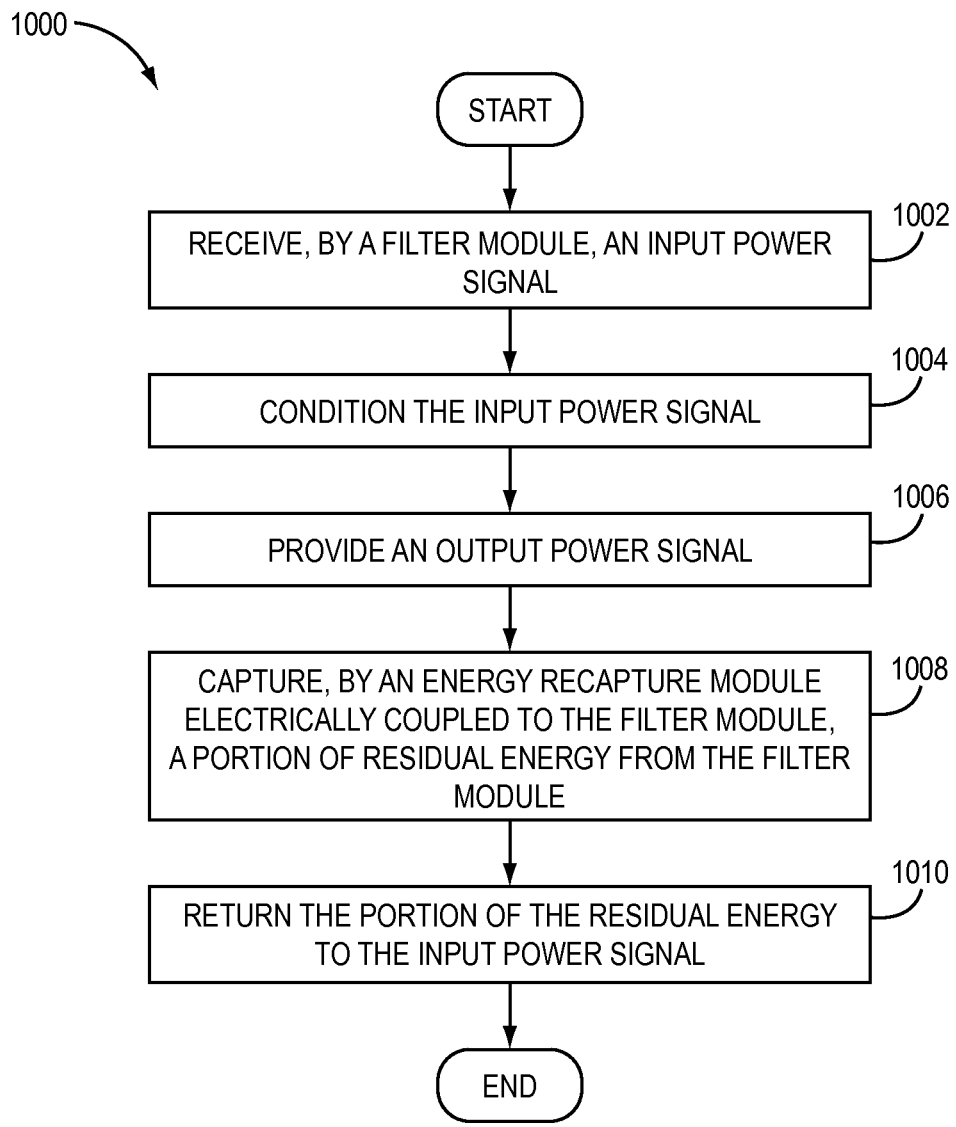
FIG. 8 is a flowchart of a method for generating an output power signal according to one embodiment.

FIG. 8 is a flowchart of a method 1000 for generating the output power signal 40 according to one embodiment. FIG. 8 will be discussed in conjunction with FIG. 3. As a non-limiting example, the filter module 42 receives the input power signal 44 (block 1002). The input power signal 44 provides a DC voltage of, for example, 6 V, to the control circuit 38. The filter module 42 conditions the input power signal 44 (block 1004) to provide the output power signal 40 (block 1006). In particular, the filter module 42 includes the bias capacitor 50, which provides the output power signal 40 at a stable high voltage level.

The energy recapture module 46, which is electrically coupled to the filter module 42, captures the portion of the residual energy from the filter module 42 (block 1008). In particular, the energy recapture module 46 captures the portion of the residual energy from the filter module 42 when the output power signal 40 is at a high voltage level and returns the portion of the residual energy to the input power signal 44 when the output power signal 40 is at a low level. The energy recapture module 46 then returns the portion of the residual energy to the input power signal 44 (block 1010). In particular, the energy recapture module 46 returns the portion of the residual energy to the input power signal 44 when the output power signal 40 is at a low level.

Figure 9:
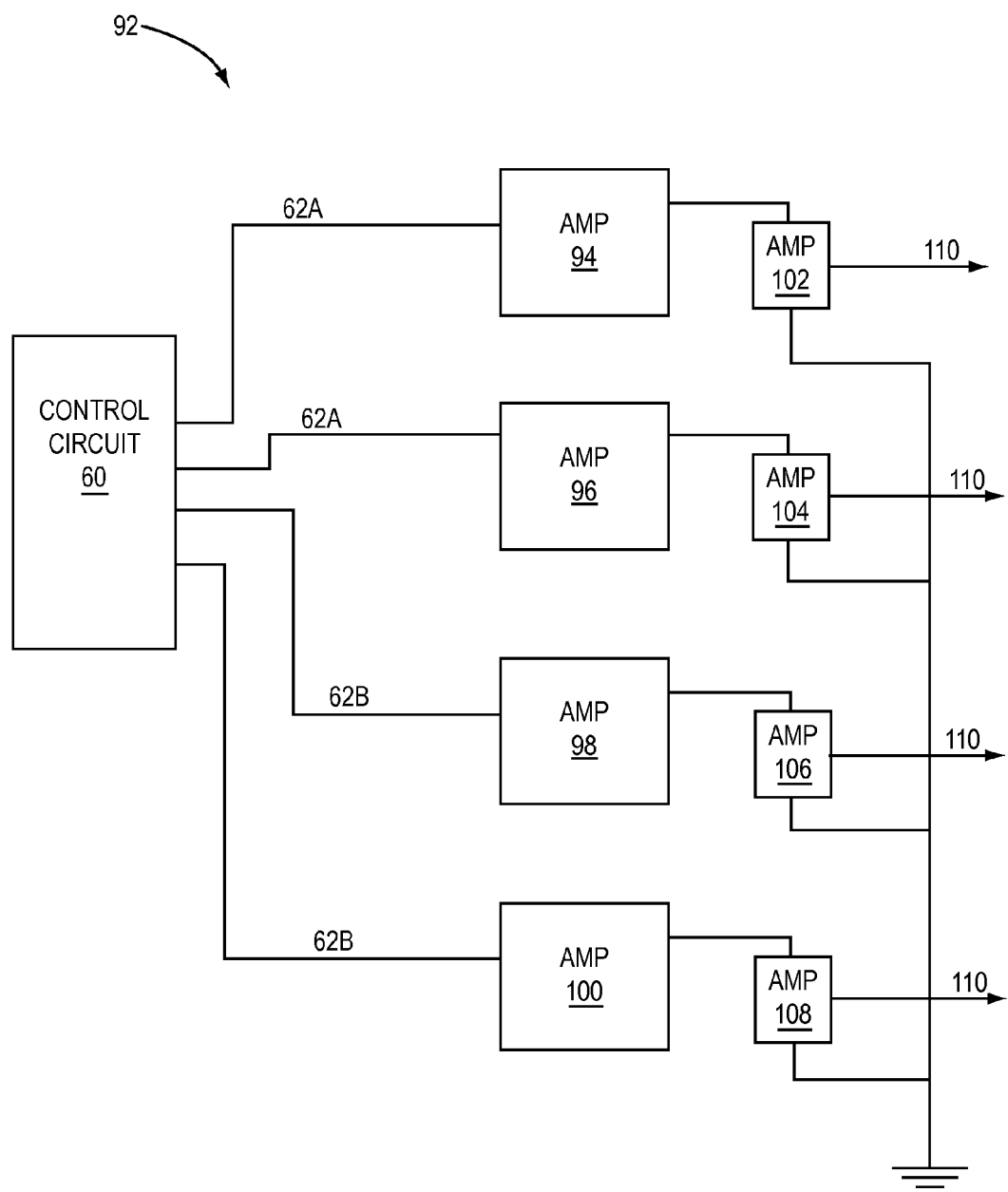
FIG. 9 is a block diagram of a system for transmitting a wireless signal, the system including a control circuit for generating an output power signal according to one embodiment.

FIG. 9 is a block diagram of a system 92 for transmitting a wireless signal 110. The system 92 includes the control circuit 60 for generating the output power signals 62 according to one embodiment. FIG. 9 will be discussed in conjunction with FIG. 5. In FIG. 9, the control circuit 60 for generating the output power signals 62a and 62b is coupled to amplifiers 94, 96, 98, and 100 to drive the amplifiers 94, 96, 98, and 100 and to transmit the corresponding wireless signal 110. In particular, the output power signals 62a, provided by the filter module 66a and the energy recapture module 70a of the control circuit 60, drive the amplifiers 94 and 96 to generate portions of the wireless signal 110 through their corresponding loads 102 and 104. Similarly, the output power signals 62b, provided by the filter module 66b and the energy recapture module 70b of the control circuit 60, drive the amplifiers 98 and 100 to generate other portions of the wireless signal 110 through their corresponding loads 106 and 108.

Those skilled in the art will recognize improvements and modifications to the preferred embodiments of the disclosure. All such improvements and modifications are considered within the scope of the concepts disclosed herein and the claims that follow.

What is claimed is:

1. A control circuit comprising:
    a filter module configured to condition an input power signal to provide an output power signal;
    an energy recapture module, electrically coupled to the filter module; and
    a control module, electrically coupled to the filter module and the energy recapture module, configured to:
        provide, during a first period of time, a first control signal to the filter module and a second control signal to the energy recapture module to generate a first power level of the output power signal and to capture, by the energy recapture module, a portion of residual energy from the filter module;
        provide, during a second period of time, a third control signal to the energy recapture module to return the portion of the residual energy to the input power signal; and
        provide, during a third period of time, a fourth control signal to the filter module to generate a second power level of the output power signal.

2. The control circuit of claim 1, wherein:
    the filter module comprises a bias capacitor; and
    the portion of the residual energy comprises energy discharged from the bias capacitor during the first period of time.

3. The control circuit of claim 2, further comprising an electrical component comprising a parasitic element, wherein the portion of the residual energy further comprises energy discharged from the electrical component based on the parasitic element during the first period of time.

4. The control circuit of claim 3, wherein the electrical component comprises one of a p-n junction and a printed circuit board, and the parasitic element comprises a junction capacitance of the p-n junction and a board layer capacitance of the printed circuit board.

5. The control circuit of claim 1, further comprising an electrical component comprising a parasitic element, wherein the portion of the residual energy comprises energy discharged from the electrical component based on the parasitic element during the first period of time.

6. The control circuit of claim 5, wherein the electrical component comprises one of a p-n junction and a printed circuit board, and the parasitic element comprises one of a junction capacitance of the p-n junction and a board layer capacitance of the printed circuit board.

7. The control circuit of claim 1, wherein the energy recapture module comprises an inductor configured to:
    capture the portion of the residual energy during the first period of time; and
    return the portion of the residual energy to the input power signal during the second period of time.

8. The control circuit of claim 1, wherein the filter module comprises a bias capacitor, and the first period of time comprises a discharge time of the bias capacitor.

9. The control circuit of claim 1, further comprising an electrical component comprising a parasitic element, wherein the first period of time comprises a discharge time of the electrical component based on the parasitic element.

10. The control circuit of claim 1, wherein the energy recapture module comprises a fly back circuit, the fly back circuit comprising:
    an inductor;
    a diode; and
    a switching element; and
    wherein the energy recapture module is further configured to:
        capture the portion of the residual energy based on a first state of the switching element; and
        return the portion of the residual energy based on a second state of the switching element.

11. A method for generating an output power signal comprising:
    receiving, by a filter module, an input power signal;
    conditioning, by the filter module, the input power signal to provide an output power signal;
    providing, by a control module, during a first period of time, a first control signal to the filter module to generate a first power level of the output power signal;
    providing, by the control module, a second control signal during the first period of time to an energy recapture module that is electrically coupled to the filter module to capture, by the energy recapture module, a portion of residual energy from the filter module;
    providing, by the control module, during a second period of time, a third control signal to the energy recapture module to return the portion of the residual energy to the input power signal; and
    providing, by the control module, during a third period of time, a fourth control signal to the filter module to generate a second power level of the output power signal.

12. The method of claim 11, further comprising:
    charging, via the input power signal, a bias capacitor of the filter module; and
    discharging, during the first period of time, the bias capacitor of the filter module of energy received from the input power signal, wherein the portion of the residual energy comprises the energy discharged from the bias capacitor.

13. The method of claim 11, wherein conditioning the input power signal comprises:
    providing the input power signal to an electrical component, the electrical component comprising a parasitic element; and
    discharging, during the first period of time, the electrical component of energy received from the input power signal, wherein the portion of the residual energy comprises the energy discharged from the electrical component based on the parasitic element.

14. The method of claim 11, further comprising:
    storing, in the energy recapture module, the portion of the residual energy during the first period of time.

15. The method of claim 11, wherein the first period of time comprises a discharge time of a bias capacitor of the filter module.

16. The method of claim 11, wherein the first period of time comprises a discharge time of an electrical component based on a parasitic element of the electrical component.

17. The method of claim 11, further comprising:
storing, in an inductor of a fly back circuit of the energy recapture module, the portion of the residual energy during the first period of time; and
providing, by the inductor of the fly back circuit of the energy recapture module, the portion of the residual energy to the input power signal during the second period of time.

18. A control circuit comprising:
a filter module configured to condition an input power signal to provide an output power signal;
an energy recapture module, electrically coupled to the filter module, the energy recapture module comprising a fly back circuit, the fly back circuit comprising:
an inductor;
a diode; and
a switching element; and
wherein the energy recapture module is configured to:
capture a portion of residual energy from the filter module based on a first state of the switching element; and
return the portion of the residual energy based on a second state of the switching element; and
a control module, electrically coupled to the filter module and the energy recapture module, configured to:
control the filter module to provide the output power signal; and
control the energy recapture module to capture the portion of the residual energy and return the portion of the residual energy to the input power signal.

* * * * *